Dec. 7, 1965 P. E. DRAPKIN 3,222,459

WIDEBAND FREQUENCY MODULATION SYSTEMS

Filed April 30, 1962

PAUL E. DRAPKIN
INVENTOR.

BY Nathan N. Kallman

ATTORNEY

United States Patent Office 3,222,459

Patented Dec. 7, 1965

3,222,459
WIDEBAND FREQUENCY MODULATION SYSTEMS

Paul E. Drapkin, San Francisco, Calif., assignor to Ampex Corporation, Redwood City, Calif., a corporation of California Filed Apr. 30, 1962, Ser. No. 191,198
3 Claims. (Cl. 179—100.1)

Figure 1:
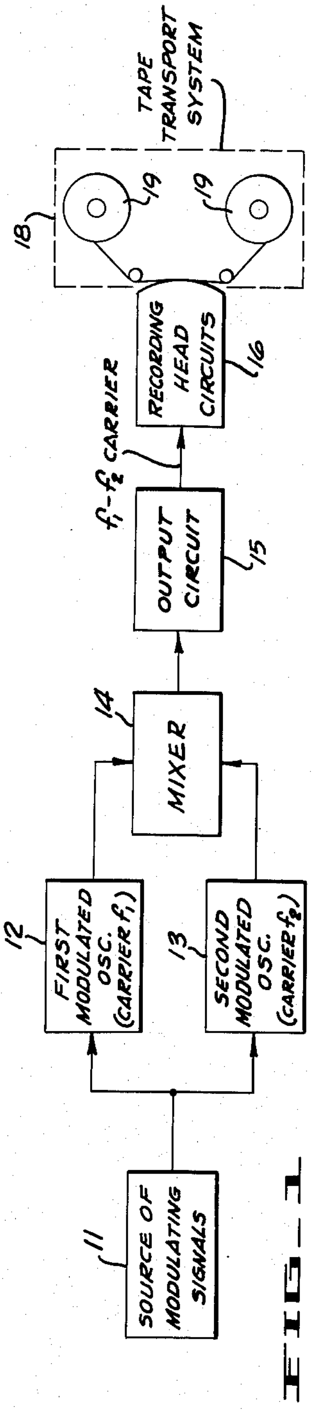

This invention relates to frequency modulation circuits and systems and more particularly to precision frequency modulating circuits for wideband recording systems.

Systems which are capable of recording and reproducing electrical signals covering wide frequency bands are in wide use because they permit storage and processing of great amounts of information at high speeds. Television and instrumentation recording are perhaps the most demanding applications for wideband recording systems. In recording television signals, for example, the recording equipment must be able to process signals over a four megacycle frequency band with precise time base stability. Comparable capabilities are required in instrumentation recording, in which rapidly varying data may be received from a great many sources simultaneously.

It is extremely difficult to design and operate relatively uncomplicated circuitry so as to obtain linear response over an entire wide frequency band. For example, it is well known that circuit components have inherent nonlinear characteristics which cannot readily be compensated. Furthermore, temperature variations are known to cause the operational characteristics of circuit components to drift, often in an amount sufficient to make wideband recording and reproduction impractical. The drifts and nonlinearities resulting from temperature variations are especially noticeable with semiconductor components. On the other hand, semiconductor components are especially useful in most systems because of their small size, long life and lower power requirements.

With magnetic tape systems, frequency modulation of input signals for recording purposes has many advantages. By using frequency modulation and a relatively high carrier frequency a wide frequency band can be encompassed without imposing impractical requirements as to the number of octaves to be recorded by the magnetic heads. In addition, magnetic heads vary in sensitivity and frequency modulation provides a signal limiting action which permits much greater uniformity. As another advantage, frequency modulation obviates the need for applying a high frequency bias to the recording heads.

The introduction of nonlinearities at the frequency modulator are especially undesirable because their effects are thereafter retained in other parts of a system. Furthermore, in any frequency modulator where an extreme bandwidth is covered, the upper frequencies of the information band may approach close to the carrier frequency of the frequency modulated signal. When this happens, the higher modulation frequencies may tend to break through into the output of the carrier generator, introducing a video feedthrough in television signals, for example. Once introduced, such components are thereafter extremely hard to separate and tend to sharply degrade the reproduced signals.

It is therefore a general object of this invention to provide an improved wideband frequency modulator.

A more specific object of this invention is to provide a precision wideband frequency modulation system utilizing semiconductors and displaying an extremely linear output response over its bandwidth.

An additional object of this invention is to provide stabilized recording-reproducing system using wideband frequency modulation; which systems minimize the effects of inherent and temperature-induced component nonlinearities.

Briefly, the objects of this invention are accomplished by a wideband frequency modulation circuit which includes a pair of variable frequency oscillators. The oscillators have nominal frequencies which are spaced apart by a predetermined interval and are chosen to be substantially higher than the highest modulating signals. The oscillators are individually frequency modulated by means of tuned input circuit arrangements which include voltage variable reactance or capacitive elements. The same modulating signal is applied to the input circuits of the two oscillators to vary the reactances, or capacitances of variable capacitors, for example, in opposite senses. The oscillators thus shift in frequency by substantially equal amounts but in opposite senses. The frequency modulated output signals from the oscillators are heterodyned in a mixer circuit to generate frequency modulated components about a carrier frequency which is constant because it is equal to the difference between the nominal frequencies of the two oscillators.

Because the oscillators are driven at carrier frequencies which are substantially greater than the high end modulating frequencies, the modulating signals do not tend to break through to appear in the output signal. Moreover, because substantially identical variable reactances, such as capacitors, in the tuned input circuits are driven in opposite directions from linear center points in response to changes in the input signal, the non-linearities of the variable reactances are effectively cancelled. Changes in the ambient temperature affect both voltage variable components in like sense and amounts and tend to maintain output carrier frequency generated by the mixer constant. Furthermore, the dual oscillators double the modulation effect and allow modulation by a smaller, more linear, input signal.

Figure 2:
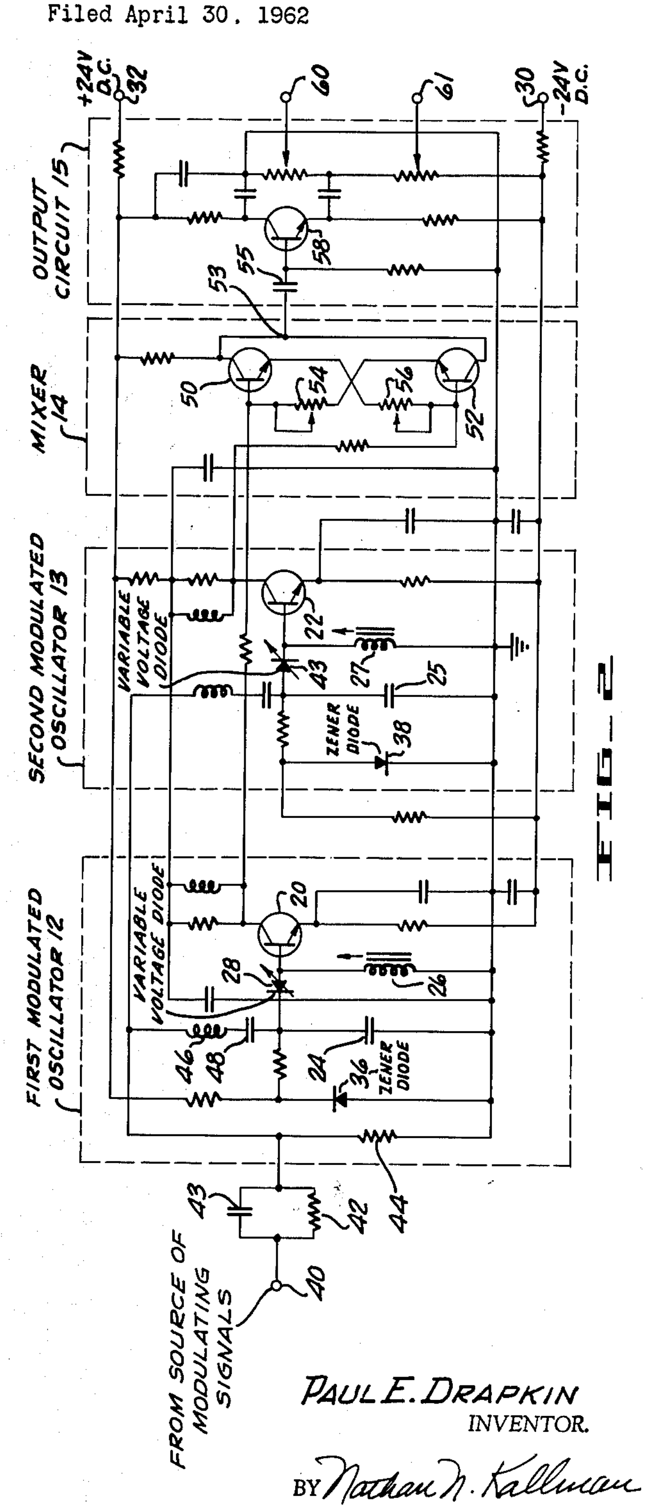

A better understanding of the invention may be had by reference to the following detailed description, taken in conjunction with the drawings in which like components have like designations, and in which:

FIGURE 1 is a block diagram of a frequency modulation circuit for a wideband recording system in accordance with the invention; and FIGURE 2 is a schematic diagram of a wideband frequency modulator in accordance with the invention.

In FIGURE 1 is shown a block diagram of a wideband frequency modulation system in accordance with the invention. A source of modulating signals 11 is connected to provide an analog voltage modulating signal to first and second modulated oscillators 12 and 13. In one example of circuits and systems in accordance with the invention, the signals from the source 11 may constitute a video signal appearing in a frequency range from ten cycles per second to four megacycles per second. The oscillators 12 and 13 have selected nominal frequencies $f_1$ and $f_2$, which may be varied by an applied input signal. The signals from the source 11 are applied to the modulated oscillators 12 and 13 to vary the output frequencies in opposite senses from the norminal frequencies. Thus, the frequency of the signal generated by the first oscillator 12 may be shifted up, while the frequency of the signal generated by the second oscillator 13 is shifted down, and vice versa. The exemplary oscillators 12 and 13 are two very high frequency (VHF) oscillators having their nominal carrier frequencies $f_1$ and $f_2$ spaced apart by a desired resultant carrier frequency value. For example, if a final carrier frequency of six megacycles per second is desired, the oscillator 12 might be operated at a frequency of 106 megacycles per second while the oscillater 13 might be operated at a carrier fequency of 100 megacycles per second. With these values, video components are well outside the frequency modulation band and do not tend substantially to break through to the oscillators 12 and 13.

The two frequency modulated signals from the oscillators 12 and 13 are coupled to separate inputs of a mixer 14 which functions in a well known manner to heterodyne the two oscillator signals. The resultant output signal components are applied to an output circuit 15 which amplifies the carrier ($f_1$–$f_2$ at the nominal difference frequency) and rejects the unwanted frequency varying components. The frequency modulated signal is then recorded by circuits 16 associated with a tape transport system 18, only the reels 19 of which have been represented in FIGURE 1, for simplicity.

In FIGURE 2 is shown a schematic illustration of a circuit embodying the invention. Circuit values will be understood to be given for illustrative purposes only. The circuit of the first modulated oscillator 12 inches an NPN conductivity type transistor 20 and, similarly, the second oscillator 13 includes an NPN conductivity type transistor 22. Operational bias is applied to the two oscillators 12 and 13 from a source of positive potential 32, a source of negative potential 30 and a common or ground coupling. As is well known, PNP transistors may be utilized in place of NPN transistors in the oscillators 12 and 13 and throughout the modulator by reversing the sense of biasing.

The first oscillator 12 includes an electronically variable tuned input circuit comprising a capacitor 24, a variable inductor 26 and a voltage variable capacitor (or varicap) 28. The variable tuned circuit for the second oscillator 13 likewise comprises a capacitor 25, a variable inductor 27 and a voltage variable capacitor 43. The variable inductors 26 and 27 allow initial selective tuning of the input circuits.

A voltage variable capacitor is preferably provided by a semiconductor element such as a silicon diode, which exhibits a capacitance that varies essentially as the inverse square of the applied voltage. Voltage variable capacitors are small in size, exhibit rapid response and are reliable and stable under shock and vibration. While all semiconductive junction devices exhibit voltage-variable capacitive effects, certain silicon diodes are now used widely for such purposes. They comprise PN junctions which are voltage biased negative to positive to form a region adjacent the junction which is depleted, or free, of mobile charge and essentially constituting a dielectric. The width of the depleted region is variable in accordance with the applied bias voltage and determines the value of capacitance of the junction. Voltage variable capacitors of this type are especially useful for control of the first and second modulated oscillators 12 and 13 because they have the rapid response necessary to wideband applications. Moreover, voltage variable capacitors have been perfected to the point where they provide the precision requisite to the recording of a substantial amount of high frequency information.

It is to be especially noted that the voltage variable capacitors 28 and 43 are oppositely poled in the input circuits for the transistors 20 and 22. The capacitors 28 and 43 are each initially reverse biased at predetermined operational points near the centers of their linear ranges by different ones of a pair of oppositely poled zener diodes 36 and 38 which are also coupled to ground.

Input signals are provided to the oscillators 12 and 13 as an input voltage derived from a source of modulation signals 40. The signals are coupled from the source 40 through an RC passive network 42, 43, 44 which provides high frequency preemphasis to the input circuits of both oscillators 12 and 13 in equal fashion. In view of the fact that the two oscillators 12 and 13 are substantially alike and vary only in the circuit values chosen to provide the different carrier frequencies, the operation of only one of the two oscillators need be described in detail.

In the first modulated oscillator 12, for example, the input signals are transferred to the input circuit through an inductor 46 which is self-resonant at 87 mc., the nominal frequency of the first oscillator 12. The inductor 46 thus decouples the two oscillators 12, 13. The input signals are applied through a coupling capacitor 48 to vary the bias voltage appearing at the voltage variable capacitor 28. With a seven volt zener diode 36 the typical variable element 28 has a capacitance of 35 micromicrofarads. The oscillator 12 is initially adjusted to 87 mc. by adjustment of the inductor 26 in the tuned circuit 24, 26, 28 which tuning is then modified by voltage control of the variable capacitor 28. The transistor 20 is arranged in a conventional oscillator arrangement with reverse biased junction capacitance establishing the oscillatory feedback path from its collector to its base. The oscillator 12 generates a frequency modulated signal having a carrier frequency determined by the capacitor 24, the setting of the inductor 26 and the no-signal bias point of the voltage capacitor 28. The variations in the bias upon the variable capacitor 28 caused by the input signals appear as variations in frequency of the carrier at the collector of the transistor 20.

The input signals provided from the source 40 vary the biases on the variable capacitors 28 and 43 in opposite senses, increasing the capacitance of the input circuit of one oscillator while decreasing the capacitance of the input circuit of the other oscillator. The result is substantially equal but apposite shifting of the frequencies of the oscillators. Because the variable capacitors 28 and 43 are substantially identical, but oppositely poled, and are biased initially to operate at a central region of their linear range, the opposite effects resulting from a change in the input voltage tend to change the capacitance in opposite directions from the no-signal bias point. Heterodyning of the two frequency modulated signals combines the modulating effects in such manner that the nonlinearities of the two variable capacitors 28 and 43 are balanced out and eliminated. It should particularly be noted that the voltage variable capacitors 28 and 43 need be operated over only a relatively narrow part of their operational range since the output signal is effectively modulated in accordance with the sum of the two individual frequency shifts. Thus the extent of variation demanded of each variable capacitor is only half of what it otherwise might be.

The frequency modulated signals appearing at the collectors of the transistors 20 and 22 in the oscillators 12, 13 respectively are separately applied to the bases of an interconnected pair of NPN conductivity type mixing transistors 50 and 52. The transistors 50 and 52 are intercoupled by a pair of variable resistors 54 and 56 which are set to equalize the outputs from the two halves of the mixer circuit. The collectors of the transistors 50, 52 are coupled together at a circuit junction 53 which is connected through a coupling capacitor 55 to the output circuit 15. The separate frequency modulated inputs drive the transistors 50, 52 simultaneously, but the circuit provides isolation between the inputs as well as some amplification. The floating output coupling of the transistors 50, 52 permits all components of both input signals, as well as sum and difference frequencies, to appear at the circuit junction 53. Note, however, that the difference frequency, varying from the carrier of 6 mc., is appreciably lower than all other frequency components. Attenuation of the high frequency components in the mixer 14 and the output circuit 15 leaves effectively only the difference frequency. Because of the high input frequencies to the mixer, however, video feed through effects are not encountered.

For this reason, no output filter is necessary in the circuit of FIGURE 2. The resultant frequency modulated carrier signal is aplied to the base of an NPN conductivity type transistor 58 in the output stage 15. The transistor 58 is coupled as an emitter follower to provide a pair of output signals at separate output terminals 60 and 61 which may be utilized in a well known manner.

Of especial note with regard to the circuit of FIGURE 2, is the arrangement whereby temperature variations which might affect component operational characteristics are effectively eliminated in the output signal. Since the oscillators include substantially identical components, temperature variations will affect the components in a like manner. If temperature variations cause a change in any circuit characteristic, the same change will occur in the other oscillator; and the difference between the two modulated frequencies is maintained constant. Furthermore, the opposite variations of the variable capacitors which are used almost completely cancel second order non-linearities. Modulation linearities of as much as 0.01% are feasible with such circuits.

Although particular wideband modulation systems and circuits have been described to illustrate the manner in which various aspects of the invention may be used to advantage, it will be appreciated that the invention is not limited thereto. Accordingly, any and all modifications, alterations and equivalent arrangements falling within the scope of the following claims should be considered to be a part of the invention.

What is claimed is:

1. A circuit for generating a frequency modulated signal having upper modulating frequencies approaching the magnitude of the carrier frequency comprising:

first and second oscillator circuits, each of said oscillator circuits including a transistor having base, emitter terminals;

an inductor arranged between said emitter and base terminals;

means for providing a variable capacitance in parallel with said inductor;

and output means connected to the collector terminals of each of said transistors, the values of the components of the oscillators being such as to establish first and second spaced nominal frequencies; substantially higher than the upper modulating frequencies;

means for providing an input signal to vary coincidently the capacitance of each of said oscillators, substantially equally but in opposite senses; and means for heterodyning the signals appearing at the output means of the transistors to derive a frequency modulated output signals at a carrier frequency equal to the frequency difference between said generated signals, said first and second nominal frequencies being spaced apart by a frequency slightly exceeding the upper modulating frequencies.

2. A wideband recording system including a frequency modulating circuit and comprising:

a source of wideband frequency input signals;

first and second oscillator circuits for providing first and second spaced nominal frequencies substantially higher than the upper input signal frequencies, each oscillator circuit comprising a transistor;

means for providing bias potentials to said transistor;

each oscillator circuit also including a tuned input circuit including a variable inductor, a first capacitor and a second voltage variable capacitor, the oscillator circuits each also including means for applying a bias voltage to the variable capacitor to determine its capacitance and means for deriving signals from the source of input signals to vary the bias on the variable capacitor, the variable capacitors being oppositely arranged in the first and second oscillator circuits;

a mixer circuit including first and second transistors each having base, emitter and collector terminals, input means coupling the output terminals of each of the first and second oscillators, respectively to the bases of the different mixer transistors individually, said mixer circuit including variable resistance means connecting the emitter of each transistor to the base of the other transistor and a common connection between the collectors of the two transistors; and an output circuit including a coupling capacitor connected to the common connection of the mixer circuit, and an output amplifier circuit connected to receive signals from said coupling capacitor, and a recording means for recording the amplified signals from said output amplifier circuit.

3. A circuit for providing wideband frequency modulation of a carrier signal comprising:

first and second oscillator circuits for providing first and second spaced nominal frequencies, each of said oscillator circuits including a transistor having input and output terminals;

means for providing bias potentials to the transistor; means providing a capacitive feedback path between the input and output terminals of the transistor; and each of said oscillator circuits also including a tuned circuit connected to the input terminal including a variable inductor, a first capacitor, a second variable capacitor connected in circuit with said first capacitor and said inductor, and a zener diode connected to apply operating potentials to said variable capacitor;

means for providing input signals to vary the voltage biasing the variable capacitors of each of said oscillators in opposite senses including a source of input signals;

means for transferring input signals from said source to a common point;

and an inductor in each oscillator circuit connected between one terminal of said variable capacitor for the oscillator circuit and the common point, at least one of said inductors being of a value to provide self-resonance at the oscillation frequency of its associated transistor oscillator;

a mixer circuit comprising first and second transistors, each of said mixer transistors having a base terminal connected to the output terminal of one of the oscillator circuit and the common point, at least collector terminal connected to the collector terminal of the other mixer transistor;

variable resistance means coupling the emitter terminals and base terminals of the mixer transistors;

means for operatively biasing said mixer circuit; and output means for deriving a signal at the connected collectors of the mixer transistors.

References Cited by the Examiner

UNITED STATES PATENTS

| | | | |
|---|---|---|---|
| 2,735,983 | 2/1956 | McLeod | 332—23 X |
| 2,852,678 | 6/1958 | Crapuchettes | 331—48 |
| 2,984,794 | 5/1961 | Carter et al. | 332—30 X |
| 3,020,493 | 2/1962 | Carroll | 332—30 X |
| 3,023,378 | 2/1962 | Fuller | 332—52 |
| 3,188,615 | 6/1965 | Wilcox | 179—100.2 X |

ROY LAKE, *Primary Examiner.*

ALFRED L. BRODY, *Examiner.*